N. DUPUIS.
LIFTING DEVICE FOR PUSH CARTS.
APPLICATION FILED JAN. 21, 1913.
1,082,226.
Patented Dec. 23, 1913.
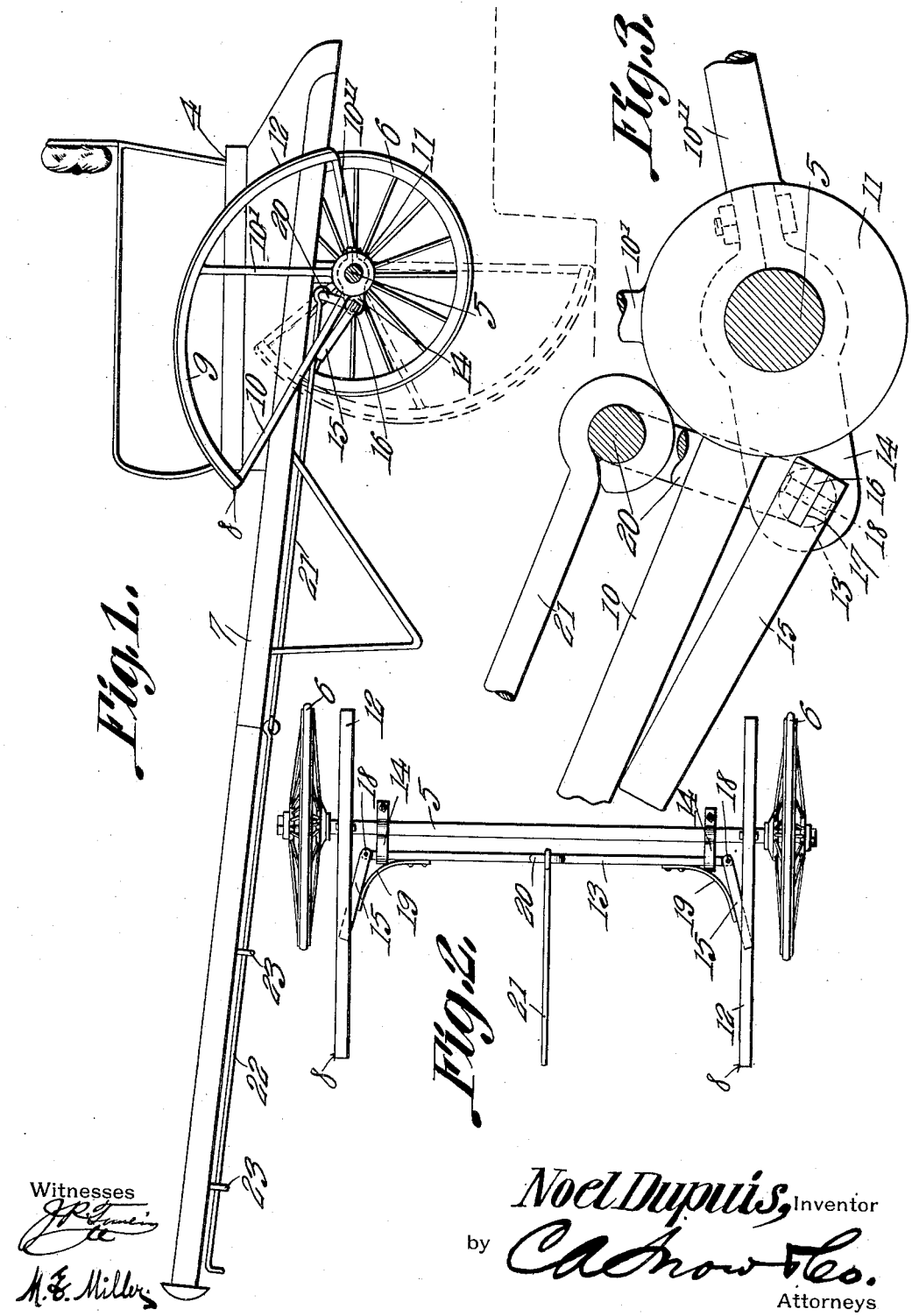
Noel Dupuis, Inventor
Witnesses

UNITED STATES PATENT OFFICE.

NOËL DUPUIS, OF ABERDEEN, WASHINGTON.

LIFTING DEVICE FOR PUSH-CARTS.

1,082,226.   Specification of Letters Patent.   Patented Dec. 23, 1913.

Application filed January 21, 1913. Serial No. 743,412.

*To all whom it may concern:*

Be it known that I, NOËL DUPUIS, a citizen of the United States, residing at Aberdeen, in the county of Chehalis and State of Washington, have invented a new and useful Lifting Device for Push-Carts, of which the following is a specification.

The present invention relates to a lifting device for push carts and other vehicles, and aims primarily to provide means for lifting the wheels of push carts over a curb or other raised or stepped obstruction when the wheels approach the same.

It is also the object of the present invention to provide means whereby the lifting mechanism may be normally maintained in inoperative position, permitting the lifting mechanism to be raised after the wheels have been elevated on to a curb or the like, and permitting the lifting mechanism to be again brought into operation when another obstruction is met.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The invention has been illustrated in its preferred embodiment in the accompanying drawing, wherein:—

Figure 1 is a side elevation of a push cart, the wheel on the near side being removed, and certain parts being shown in dotted lines to indicate their positions in the act of lifting the wheels on to a curb. Fig. 2 is a plan view in detail, the seat and tongue of a push cart being removed, and parts of the attachment being broken away. Fig. 3 is an enlarged fragmental detail.

Referring specifically to the drawings, the push cart embodies the usual seat 4 mounted on the axle 5, which is provided with the wheels 6 at its ends, a tongue or handle 7 being secured between the seat and axle. In carts of this character, the seat 4 generally faces rearwardly, and the tongue 7 projects rearwardly in an inclined position, in order that the operator may readily push or propel the cart. It is to be understood, however, that the details of the cart are of no moment, and that the present invention is applicable to various push carts as well as other vehicles, as is within the spirit of the invention.

In carrying out the present invention, there is provided a lifting means consisting in a pair of cams or eccentrics 8 rotatably mounted on the axle 5 adjacent the respective wheels or adjacent the respective ends of the axle. These cams may be suitably disposed between the respective wheels and the sides of the seat, and are of proper proportions to suit the circumstances.

Each of the cams or eccentrics 8 comprises the rim 9 which is of arcuate or involute form, the spokes 10, 10' and 10" converging to the hub 11, which is journaled on the axle, and preferably, a rubber or resilient tread 12 secured to the rim 9, although the rubber or resilient tread need not be employed. The "inner" end of each rim 9 is preferably or practically flush with the rim of the respective wheel 6, whereas the "outer" end of the rim 9 is spaced a suitable distance from the rim of the wheel in order to effectively raise the wheel over a curb or other similar obstruction. The particular construction of the cams may be altered as desirable, the same being of no particular moment, other than the fact that the cams must be of proper construction as to be capable of engagement by the latches hereinafter referred to.

In order that the cams may ordinarily be held in inoperative position, or raised from the underlying surface, and in order that they may be readily brought into operative position, there has been provided an actuating mechanism embodying a rocking shaft 13 parallel with the axle 5 and journaled through a pair of bearings 14 clamping, embracing, or otherwise engaging the axle 5 to properly support the same, and a latch 15 which has been pivoted to each end of the shaft 13 for engaging the respective cams 8. Each latch 15 is pivoted to the corresponding end of the shaft 13 to have limited swinging movements relative thereto and in a manner as follows: The end of the shaft 13 is flattened so as to provide a tongue or tenon 16, and the inner or pivoted end of the latch 15 is bifurcated or forked to provide a slot or opening 17 to receive the tongue or tenon 16, a rivet or other pivot pin 18 being passed through the overlapped parts. This joint or pivotal connection is such, as to permit the latch 15 to have limited swinging movements into and out of the plane of the respective cams, each latch being spring pressed or yieldably forced outward into the path of the cam by means of a leaf spring 19 riveted or otherwise secured to the shaft 13 and bearing at its free end against the latch. The latches 15 are adapted to normally snap into engagement with or project under the rear or longest spokes 10 of the cams, so as to support the cams, in a raised position as indicated in full lines in Fig. 1.

As a means for locking the shaft 13, the shaft is provided at an intermediate point with an upstanding crank 20, and a connecting rod or pitman 21 connects the crank 20 with an actuating rod 22 slidably mounted in the guides 23 carried by the tongue 7. The pitman 21 is preferably constructed of a rod, stout wire or the like and formed into eyes at its ends embracing the crank 20 and a terminal eye at the forward or lower end of the actuating rod 22, respectively. The guides 23 may be of any suitable construction, such as staples, screw eyes, and the like, they being designed to firmly hold the actuating rod 22 for reciprocatory movements.

The attachment as a whole is comparatively simple, compact, durable and inexpensive in construction, may be readily applied to various push carts and the like, and is comparatively efficient, durable, and simple in its operation.

In operation, the actuating rod 22 is normally held or maintained in such a position that the latches 15 will properly support the cams above the street, sidewalk or the underlying surface. When a curb, or other similar stepped obstruction is approached, the wheels may be readily elevated or raised thereonto by pushing the rod 22 forwardly or downwardly at the proper moment, or at a point sufficiently spaced from the curb in order that the proper operation will ensue. Thus, as the actuating rod 22 is pushed forwardly, the latches 15 will be raised, and the cams will be thrown forwardly beyond dead center, in order that their centers of gravity will swing forwardly over the axle 5, in which event, the forward ends of the cams will engage the street or underlying surface. Then, as the cart is pushed ahead, the cart will roll on the cams 8, so that the same will be lifted or raised to bring the wheels onto the curb, or other obstruction as indicated in dotted lines in Fig. 1. After the cart has progressed slightly on the sidewalk adjoining the curb, or on the raised surface, the cams may again be brought out of operation by pulling the rod 22 rearwardly, so as to swing the latches 15 downwardly. The latches 15 in being swung downwardly will snap over the spokes 10 and will engage thereunder, so that when the rod 22 is again pushed forwardly slightly, the cams will be raised out of engagement with the underlying surface and will thus be maintained in normal or neutral position. It is to be understood, that after the operator has manipulated the mechanism once or twice, the operation will become so familiar or easy to him, that there will be practically no interruption of the movement of the cart, the operation being a continuous and easy one. The operator, after a little experience, will also be able to judge of the proper distance from the curb that the cams are to be lowered, so that the wheels will be most effectively elevated onto the curb.

What is claimed as new is:—

1. In combination with a wheel mounted vehicle, a lifter mounted for rotary movements carried by the vehicle and designed to engage the underlying surface to raise the wheels onto an obstruction, and means independent of the lifter carried by the vehicle engageable with the lifter to raise the same from in rear of the wheels and for throwing the lifter upwardly and forwardly in advance of the wheels to engage the underlying surface.

2. In combination with a wheel mounted vehicle, a cam mounted for rotary movements upon the vehicle, and designed to engage the underlying surface to raise the wheels onto an obstruction, and means independent of the cam carried by the vehicle and engageable with the said cam for raising the cam from in rear of the wheels and for throwing the cam upward and forward to engage the underlying surface.

3. In combination with a wheel mounted vehicle, a lifter carried thereby for rotary movements, and designed to engage the underlying surface to raise the wheels onto an obstruction, and a raising mechanism independent of the lifter carried by the vehicle and including a yieldable member engageable with the lifter, said member being engageable with the lifter when the lifter is in rear of the wheels, whereby the mechanism may be employed for raising the lifter from the underlying surface, and for throwing the lifter upwardly and forwardly in advance of the wheels to engage the underlying surface.

4. In combination with a wheel mounted vehicle, a lifter carried thereby for rotary movements, and designed to engage the underlying surface to raise the wheels onto an obstruction, and a raising mechanism independent of the lifter carried by the vehicle and including a yieldable latch engageable with the lifter when the lifter is in rear of the wheels, whereby the mechanism may be employed for raising the lifter, and for throwing the lifter upwardly and forwardly in advance of the wheels to engage the underlying surface.

5. In combination with a wheel mounted vehicle, a lifter carried thereby for rotary movements, a rocking member carried by the vehicle, a latch pivoted to the said member and engageable with the lifter when the lifter is in rear of the wheels, and means for actuating the rocking member for raising the latch, whereby the lifter is raised, and for throwing the latch upwardly and forwardly, to swing the lifter forwardly and upwardly in advance of the wheels to engage the underlying surface.

6. In combination with a wheel mounted axle, cams mounted on the axle adjacent the wheels for rotary movements, a shaft journaled to the axle, operable means carried by the ends of the shaft and coöperating with the cams to engage the cams when they are positioned in rear of the wheels, and means for actuating the shaft to thereby raise the cams, and to throw the cams upwardly and forwardly over the axle to engage the underlying surface.

7. In combination with a wheel mounted axle, cams rotatably mounted on the axle adjacent the wheels, a shaft journaled to the axle, latches pivoted to the ends of the shaft for engaging the respective cams, and means for rocking the shaft.

8. In combination with a push cart embodying a wheel mounted axle and tongue, cams rotatably mounted on the axle adjacent the wheels, a shaft journaled to the axle, operable means carried by the ends of the shaft for raising the cams, and means carried by the tongue and operably connected to the shaft for rocking the same.

9. In combination with a push cart embodying a wheel mounted axle and tongue, cams rotatably mounted on the axle adjacent the wheels, a rocking shaft journaled to the axle, spring pressed latches pivoted to the ends of the shaft for engaging the respective cams, and means carried by the tongue and operably connected to the shaft for rocking the same.

10. In combination with a push cart embodying a wheel mounted axle and a tongue, cams rotatably mounted on the axle adjacent the wheels, bearings secured to the axle, a rocking shaft journaled through the bearings and having an intermediate crank, latches pivoted to the ends of the shaft for engaging the respective cams, leaf springs secured to the shaft and pressing the respective latches into cam engaging position, an actuating rod slidably carried by the tongue, and a pitman connecting the rod and crank.

In testimony that I claim the foregoing as my own, I have hereto affixed my signature in the presence of two witnesses.

NOËL DUPUIS.

Witnesses:
SADIE SHAPTON,
F. W. LOOMIS.

---

Copies of this patent may be obtained for five cents each, by addressing the "Commissioner of Patents, Washington, D. C."